(12) United States Patent
Montgomery, Jr. et al.

(10) Patent No.: US 8,150,795 B2
(45) Date of Patent: Apr. 3, 2012

(54) METHODS AND DEVICES FOR ANALYSIS OF CLUSTERED DATA, IN PARTICULAR ACTION POTENTIALS (I.E. NEURON FIRING SIGNALS IN THE BRAIN)

(75) Inventors: Erwin B. Montgomery, Jr., Middleton, WI (US); He Huang, Madison, WI (US); Amir H. Assadi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1006 days.

(21) Appl. No.: 11/722,229

(22) PCT Filed: Dec. 22, 2005

(86) PCT No.: PCT/US2005/046629
§ 371 (c)(1),
(2), (4) Date: May 2, 2008

(87) PCT Pub. No.: WO2006/069250
PCT Pub. Date: Jun. 29, 2006

(65) Prior Publication Data
US 2009/0043220 A1 Feb. 12, 2009

Related U.S. Application Data

(60) Provisional application No. 60/638,509, filed on Dec. 22, 2004.

(51) Int. Cl.
*G06F 15/00* (2006.01)
*G06F 15/18* (2006.01)

(52) U.S. Cl. ......................................... 706/62

(58) Field of Classification Search ................ 706/62
See application file for complete search history.

(56) References Cited

U.S. PATENT DOCUMENTS

| | | | |
|---|---|---|---|
| 6,011,996 A | 1/2000 | Gielen et al. |
| 6,066,163 A | 5/2000 | John |
| 6,253,109 B1 | 6/2001 | Gielen |
| 6,301,492 B1 | 10/2001 | Zonenshayn |
| 6,330,466 B1 | 12/2001 | Hofmann et al. |
| 6,343,226 B1 | 1/2002 | Sunde et al. |
| 6,354,299 B1 | 3/2002 | Fischell et al. |
| 6,368,147 B1 | 4/2002 | Swanson |
| 6,454,774 B1 | 9/2002 | Fleckenstein |
| 6,459,936 B2 | 10/2002 | Fischell et al. |
| 6,463,328 B1 | 10/2002 | John |

(Continued)

OTHER PUBLICATIONS

J.C. Bezdek, L.O. Hall, and L.P. Clark, "Review of MR image segmentation techniques using pattern recognition", Medical Physics, 20(4):1033-1048, 1993.*

(Continued)

*Primary Examiner* — Jeffrey A Gaffin
*Assistant Examiner* — Vincent Gonzales
(74) *Attorney, Agent, or Firm* — Craig A. Fieschko, Esq.; DeWitt Ross & Stevens S.C.

(57) ABSTRACT

Methods for clustering of multi-dimensional data allow unsupervised grouping of multi-dimensional data points into clusters having like characteristics. The methods may be usefully applied to extracellular action potentials (neuronal spikes) measured from the brain, whereby spike data may be grouped in accordance with dimensions such as spike period, spike shape, etc., to assist in identification and location of individual neurons and/or regions of the brain.

27 Claims, 1 Drawing Sheet

U.S. PATENT DOCUMENTS

| | | | |
|---|---|---|---|
| 6,484,059 B2 | 11/2002 | Gielen | |
| 6,495,020 B1 | 12/2002 | Swanson | |
| 6,539,263 B1 | 3/2003 | Schiff et al. | |
| 6,567,690 B2 | 5/2003 | Giller et al. | |
| 6,587,724 B2 | 7/2003 | Mann | |
| 6,606,521 B2 | 8/2003 | Paspa et al. | |
| 6,662,035 B2 | 12/2003 | Sochor | |
| 6,694,162 B2 | 2/2004 | Hartlep | |
| 6,731,986 B2 | 5/2004 | Mann | |
| 7,774,053 B2 * | 8/2010 | Garell et al. | 600/544 |
| 2004/0193068 A1 | 9/2004 | Burton et al. | |

OTHER PUBLICATIONS

G. Milligan and M. Cooper, "An Examination of Procedures for Determining the Number of Clusters in a Data Set", Psychometrika, vol. 50, No. 2, pp. 159-179, 1985.*

T. Kanungo, D. Mount, R. Silverman, N. Netanyahu, A. Wu, C. Piatko, "The Analysis of a Simple k-Means Clustering Algorithm", Computational Geometry 2000, pp. 100-109, 2000.*

E. Aksay, G. Gamkrelidze, H. S. Seung, R. Baker, and D. W. Tank, "In vivo intracellular recording and perturbation of persistent activity in a neural integrator", Nature Neuroscience, vol. 4, No. 2, Feb. 2001, pp. 184-193.*

M.C. Clark, L.O. Hall, D.B. Goldgof, L.P. Clarke, R.P. Velthuizen, and M.S. Silbiger, "MRI segmentation using fuzzy clustering techniques", Engineering in Medicine and Biology Magazine, IEEE, vol. 13, No. 5, pp. 730-742, Nov./Dec. 1994.*

Giulio Tononi, Anthony R. McIntosh, D. Patrick Russell, and Gerald M. Edelman, "Functional Clustering: Identifying Strongly Interactive Brain Regions in Neuroimaging Data", Neuroimage 7, 133-149 (1998).*

Datta S, Datta S. Comparisons and validation of statistical clustering techniques for microarray gene expression data. Bioinformatics 2003;19:459-466.

Guedalia ID, London M., Werman M, An On-Line Agglomerative Clustering Method for Nonstationary Data. Neural Computation 1999;11:521-540.

Lange T, Roth V, Braun ML, Buhmann JM. Stability-Based Validation of Clustering Solutions, Neural Computation 2004;16:1299-1323.

Newby PK, Tucker KL. Empirically derived eating patterns using factor or cluster analysis: a review. Nutr. Rev. 2004;62:177-203.

Stata Reference Manual, Stata Statistical Software Release 7.0. StataCorp: Colleage Station, 1985;1:224-235.

Theodorakis S, Koutroumbas K. Pattern Recognition, second ed. Academic Press: Amsterdam, 2003.

Ozdamar, Ozcan, Detection of Transient EEG Patterns with Adaptive Unsupervised Neural Networks, *International Biomedical Engineering Days*, 1992, pp. 192-197.

Mattout, Jamie, Statistical Method for Source Localization in MEG/EEG Tomographic Reconstruction Problem, 2001, pp. 714-717.

* cited by examiner

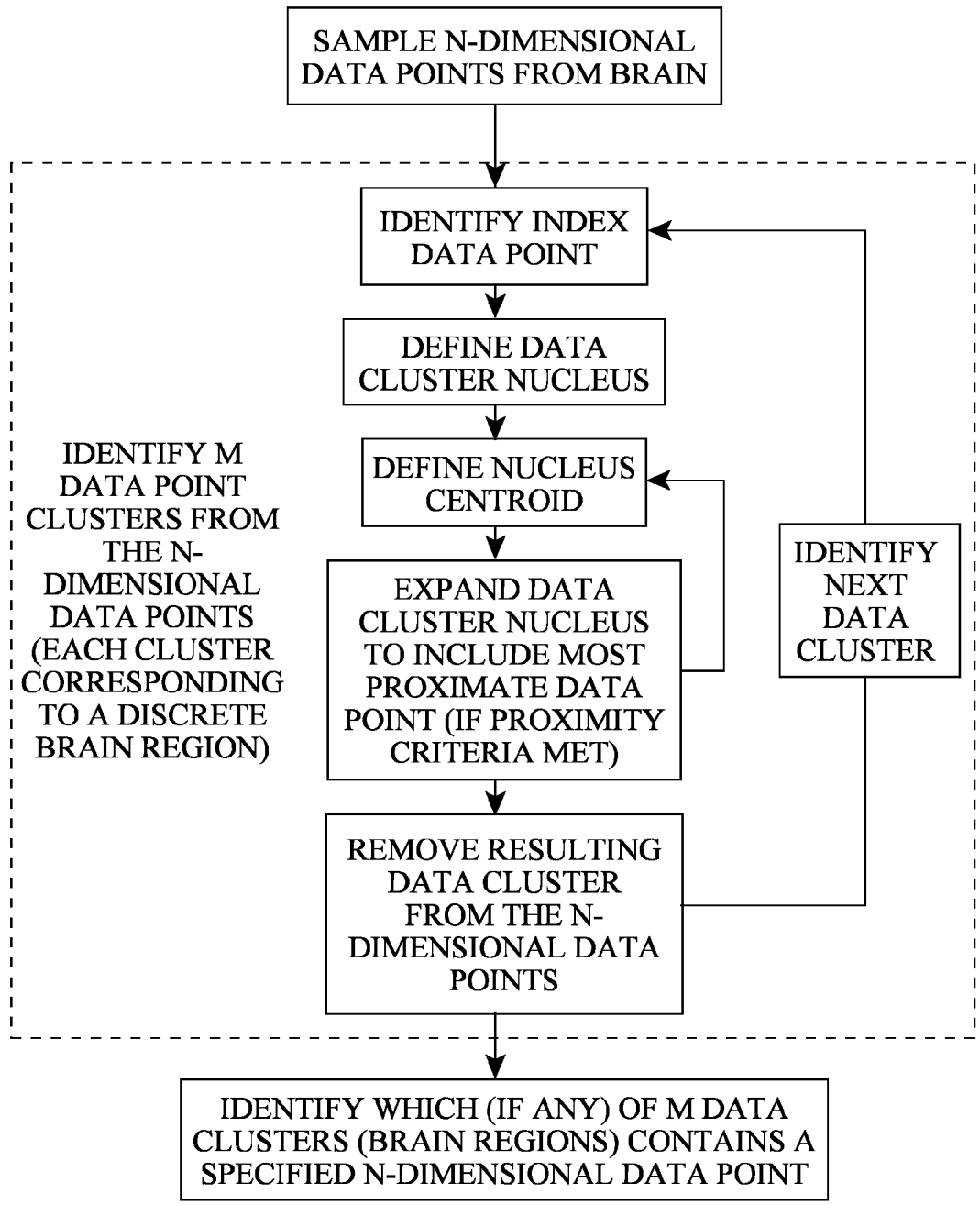

METHODS AND DEVICES FOR ANALYSIS OF CLUSTERED DATA, IN PARTICULAR ACTION POTENTIALS (I.E. NEURON FIRING SIGNALS IN THE BRAIN)

CROSS-REFERENCED TO RELATED APPLICATIONS

This application claims priority under 35 USC §119(e) to U.S. Provisional Patent Application 60/638,509 filed 22 Dec. 2004, the entirety of which is incorporated by reference herein.

STATEMENT REGARDING FEDERALLY SPONSORED RESEARCH

This invention was made with United States government support awarded by the National Institutes of Health, Grant NIH 5P51 RR000167. The United States has certain rights in this invention.

FIELD OF THE INVENTION

This document concerns an invention relating generally to analysis of collections of N-dimensional data points (i.e., points characterized by some number N of different parameters), and to the identification of clusters of data points within such data. The invention relates more specifically to methods and devices for identifying clusters of data points measured from the brain to identify specific functional regions of the brain (e.g., identifying the subthalamic nucleus, globus pallidus, etc., or subregions therein, from measured brain data).

BACKGROUND OF THE INVENTION

The brain includes gray matter, primarily collections of neurons which serve to process information and generate responsive signals, and white matter, primarily axons which serve to communicate these signals between gray matter regions and more distant parts of the nervous system. It is well known that specific regions within the gray matter are associated with particular functions; for example, motor skills are primarily controlled by regions in the cerebral cortex, the cerebellum, and the basal ganglia. Thus, there is significant interest in measuring and interpreting signals from, and delivering signals to, different regions of the brain to allow the brain to communicate with external devices and/or to modify the brain's activity. As an example, in the developing field of DBS (Deep Brain Stimulation), people with motor disorders such as Parkinson's Disease may be able to experience a significant decrease (or even cessation) of muscle tremors by the use of signals delivered to the brain (more specifically to the basal ganglia). As another example, in the developing field of man-machine interfaces, electrode arrays are implanted in the brain and the signals measured therefrom may be used to control prostheses, communication devices, or other machines. Further details can be found, for example, in U.S. Pat. No. 6,066,163 to John, U.S. Pat. No. 6,354,299 to Fischell et al., U.S. Pat. No. 6,459,936 to Fischell et al., U.S. Pat. No. 6,463,328 to John, U.S. Pat. No. 6,484,059 to Gielen, U.S. Pat. No. 6,539,263 to Schiff et al., U.S. Pat. No. 6,662,035 to Sochor, U.S. Pat. No. 6,587,724 to Mann, and U.S. Pat. No. 6,731,986 to Mann.

However, several difficulties are encountered when attempting to communicate signals to or from a particular functional region of the brain (or to some subregion thereof). One significant problem relates to proper electrode placement: how does one know whether the electrode is situated at the proper region in the brain—the one related to a particular functionality, or which communicates particular signals? Or, looking at this question conversely, if an electrode is situated at a desired region in the brain, how does one determine what signal might best be delivered to this region—in other words, what is the general "communications protocol" used by this region (the signature of the electrical pulses used by the neurons therein)? Further details can be found, for example, in U.S. Pat. No. 6,011,996 to Gielen et al., U.S. Pat. No. 6,253,109 to Gielen, U.S. Pat. No. 6,301,492 to Zonenshayn, U.S. Pat. No. 6,606,521 to Paspa et al., 6,330,466 to Hofmann et al., U.S. Pat. No. 6,657,690 to Giller et al., and U.S. Pat. No. 6,694,162 to Hartlep.

SUMMARY OF THE INVENTION

The invention, which is defined by the claims set forth at the end of this document, is directed to devices and methods which at least partially alleviate the aforementioned problems. A basic understanding of some of the preferred features of the invention can be attained from a review of the following brief summary of the invention, with more details being provided elsewhere in this document.

Preferred versions of the invention involve a device for identifying particular regions within the grey matter of the brain by analyzing data sampled from a brain (e.g., neuron firings, commonly referred to as "action potentials"), and using the characteristics of the data to determine the region where the samples were taken. For example, sampled brain data may be organized into like clusters, and the characteristics of each cluster could be compared to representative data (e.g., measurements previously taken from some control group) to map each cluster to a particular region of the brain. As a more detailed example, a surgeon might advance a probe bearing one or more electrodes through the brain, with the electrodes measuring the action potentials (neuronal firing characteristics) of the regions through which the probe advances. The location of the probe could be recorded, as well as electrical firing characteristics such as (1) spike time, (2) time between spikes, (3) spike frequency, (4) spike amplitude, (5) spike rising slope, and (6) spike falling slope. This data can then be sorted into clusters having like characteristics, and each cluster of data can be regarded as corresponding to a particular region in the brain (which may be identified with reference to representative data).

However, since the sampled data will generally be multi-dimensional—for example, the foregoing list of data characteristics has six dimensions (or seven, if probe location is counted as well)—sorting the data into like clusters is a non-trivial task. Data in one dimension can often be relatively easily grouped into clusters of like data by simply plotting the data along a linear continuum, and then visually grouping clusters of adjacent data points. Similarly, clusters can be relatively easily visually identified in data having two or three dimensions by, plotting the data in two or three dimensions (or in up to four dimensions, if color is also used to characterize data). However, as the number of dimensions grows beyond four, it becomes exceedingly difficult (if not practically impossible) to visually group data into clusters. Further, known automated methods (e.g., computer-executed algorithms) for identifying data clusters are also deficient, since these generally require some type of a priori estimate as to how many clusters are present in the data set being analyzed, and the methods then organize the data into the estimated number of clusters regardless of whether the estimate is correct.

In the invention, these difficulties are resolved by use of the following methodology. The N-dimensional data (N generally being greater than 4) is supplied to a processor, i.e., a computer or other microprocessor-driven device, an application-specific integrated circuit (ASIC), a digital signal processor (DSP), or other computing device. The processor then resolves the data points into M data point clusters (M>1), with each data cluster including data points which are proximate in N-dimensional space. If each of the M data point clusters is presumed to represent one of M regions of the brain, the characteristics of each cluster can be compared to representative data from known regions of the brain to correlate each of the M data point clusters to a known brain region. As an example, if one of the identified N-dimensional data point clusters has a centroid in N-dimensional space that generally falls within the data ranges previously measured in the globus pallidus of prior test subjects, the probe locations related to that cluster can be presumed to be situated in the globus pallidus. A similar approach can be used for the remaining clusters to map them to regions of the brain as well.

To resolve the sampled data into some number M of data clusters, the following steps are preferred. First, the sampled N-dimensional data points are analyzed in N-space to identify an "index data point": the data point which has the greatest proportion of closely proximate data points in N-space. The index data point is regarded to be an element of a data cluster which is yet to be fully defined. Next, one or more of the data points which are most closely proximate to the index data point are also regarded to be part of the to-be-defined data cluster, with the index data point and these closely proximate data points defining a data cluster nucleus. A nucleus centroid—the centroid of the data points of the data cluster nucleus—is then determined in N-space. The data cluster nucleus is then expanded to include data points which are outside of, but closely proximate in N-space to, the data cluster nucleus. This can be done by reviewing candidate data points which are outside of the data cluster nucleus, but closest in N-space to the data cluster nucleus, and expanding the data cluster nucleus to include a candidate data point if the distance in N-space between the nucleus centroid and the candidate data point falls within some predetermined distance. The nucleus centroid of the expanded data cluster nucleus can then be determined, and the process can be repeated, with the next candidate data point(s) closest to the data cluster nucleus being reviewed for inclusion in the data cluster nucleus. The overall effect of this process is to start a data cluster with an index data point, and then "grow" it by successively including adjacent points which are sufficiently close to the data cluster.

Once a cluster is fully defined (i.e., no further candidate points meet the criteria for acceptance into the data cluster nucleus), further clusters can be identified by removing the data points of the defined cluster(s) from the collection of data points being analyzed, and then repeating the foregoing methods to identify clusters in the remaining data points. In effect, once a cluster is identified, its data points may be removed or disregarded, and the methods used to identify the cluster may be repeated on the remaining data points to identify the next cluster (if any). As a result, the identified data clusters are independent, i.e., they do not share any common data points between adjacent clusters.

As noted previously, a particularly preferred application for the invention is its use to identify functional regions of the brain by identifying data clusters in sampled brain data, and correlating these clusters to known regions. As an example, the clusters might be correlated with standards, e.g., previously obtained data characterizing the action potentials at various functional regions of the brain, so that each cluster can be identified as a particular region of the brain. The cluster data will therefore effectively provide an accurate map of the functional regions of the brain, which can be useful for later operations such as surgery, electrode implanting, etc. As another example, if the data sampled from a probe includes probe location (e.g., the distance by which the probe is advanced into a particular location on the skull), the probe location data might be used, either by itself or in conjunction with other dimensions (measured parameters), to indicate that a certain cluster corresponds to a certain functional region of the brain. The action potentials (neuronal firing characteristics) of that cluster/region might then be analyzed to obtain an indication of how well that region of the brain is functioning, and/or what types of signals might be delivered to that region of the brain to obtain some desired effect.

The foregoing methods for identifying clusters beneficially do not require that any estimated number of clusters be provided before the methods can be executed, and thus these methods can be readily executed by a processor without the need for expert input. This advantage is significant since prior devices and methods, such as those noted in the Background section of this document, generally require expert operation, and the exercise of a significant amount of expert intuition and discretion, for their operation. In contrast, the present invention allows the creation and use of expert systems for analyzing brain data: sampled brain data may be compared to standards and/or to previously-measured data to allow automatic identification of functional regions of the brain, appropriate signals to be supplied to the brain, and/or other information of interest. Further advantages, features, and objects of the invention will be apparent from the following detailed description of the invention in conjunction with the associated drawings.

BRIEF DESCRIPTION OF THE DRAWINGS

The accompanying drawing provides a flowchart illustrating the steps of an exemplary preferred version of the invention.

DETAILED DESCRIPTION OF PREFERRED VERSIONS OF THE INVENTION

To review the invention in greater detail, the foregoing cluster identification method can be used in conjunction with probes and electrodes for sampling signals emitted by the brain (or for delivering stimulation signals to the brain). Following is a more detailed discussion of the steps of the cluster identification method.

(1) Collect Data Points

A collection of N-dimensional data points is gathered, preferably by advancing a probe through the brain, with the probe bearing one or more electrodes for sampling data points along the probe's path (e.g., for sampling electrical signals—extracellular action potentials—which characterize the activities of the emitting neurons). Multielectrode probes are particularly preferred, since these can simultaneously collect multiple data points from multiple neurons. The dimensions of each data point can include parameters such as spike time, time between spikes, spike frequency, spike amplitude, slope of spike rise, slope of spike fall, and/or other features characterizing the action potentials. Dimensions can also include non-electrical data, such as the measured position of the probe and/or the electrode at the time other dimensions are measured. Examples of prior probes, electrodes, and signal sampling/delivery systems can be found in (for example) U.S. Pat. No. 6,454,774 to Flechenstein, U.S. Pat. No. 6,368,147 to Swanson, U.S. Pat. No. 6,495,020 to Swanson, U.S. Pat. No. 6,343,226 to Sunde et al., and U.S. Pat. No. 6,560,472 to Hill et al., as well as in the patents noted in the Background section of this document. Additionally, U.S. provisional patent application 60/638,554 (filed 22 Dec. 2004), which is the subject of a copending United States utility patent application (and which is hereby incorporated by reference, such that it should be regarded as part of this document), describes spike characteristics such as the timing of spike maxima/minima and amplitude scaling (i.e., consistent spike waveform shape) which are useful dimensions for clustering/grouping of spikes.

The collection of sampled data points can then be provided to a processor, e.g., a personal computer, wherein the cluster identification method discussed below can then be executed on the collection. The identified clusters can then be used to define a more accurate map of the brain. As one example, by looking at the data in one cluster, it might be identified as the globus pallidus (or a particular subregion thereof), thereby indicating to a surgeon the proper location for implantation of a microelectrode. In contrast, locating the microelectrode by visual/audio monitoring of probe/electrode signals (a common practice), and/or by use of imaging equipment in conjunction with stereotactic procedures, are believed to be subject to a greater possibility of error.

Alternatively, if only one or a few data points are sampled, these data points might be agglomerated with a collection of data points previously sampled from the brain of the same or different subjects. The cluster identification method discussed below can then be performed to see in which of the resulting clusters the newly-sampled data might rest.

Alternatively, the agglomerated data points can serve to define an "average" or "standard" dataset representing the population at large, and can be used (with or without clustering) for study and comparison purposes.

In any event, the end result of this data point collection step is to define a data set which will be subjected to the steps below to define clusters of data points within the data set.

(2) Identify the Index Data Point

The index data point is then identified: the data point which has the greatest proportion of closely proximate data points in N-space. This can be done in a number of different ways, but the following method is preferred owing to its simplicity.

Initially, the distance in N-space between each data point and every other data point in the data set is calculated. For any two data points A and B having N dimensions, this distance can be calculated as:

$$D_{A-B} = ((D1_A - D1_B)^2 + (D2_A - D2_B)^2 + \ldots + (DN_A - DN_B)^2)^{1/2}$$

Thus, for some given data point A, the foregoing distance can be calculated between data point A and data point B, data point A and data point C, and so forth, until the distance between data point A and all other points is known. This process can then be repeated for data point B, data point C, etc. until the distance in N-space between each data point and every other data point is known.

Next, each data point in the data set is checked to see whether it has the greatest number of "close" neighboring data points. One way to perform this check is to consider each data point and order its distances to all other data points in ascending order, thereby resulting in a list of the other data points in nearest-to-farthest order. One can then determine the distance/radius from the data point under consideration at which some percentage of the other data points in the data set—say 10%—rest within this distance/radius. Stated more simply, for each data point, what is the distance/radius extending therefrom at which 10% of the other data points rest within this distance/radius? The data point which has the lowest distance/radius is then deemed to be the index data point, i.e., the data point with the greatest proportion of closely proximate neighboring data points.

Note that the "10% distance" noted above is not mandatory, and other distances (or other standards) can be used to define the index data point. Thus, it should be understood that the index data point may be different depending on the standard used to define it (though the index data points defined by the various standards should usually be in close proximity).

(3) Define a Data Cluster Nucleus

Next, a data cluster nucleus is defined: a prototypical or "immature" data cluster which will be iteratively expanded into a complete data cluster. The data cluster nucleus is initially defined (prior to iterative expansion) to be the index data point, plus one (or a few) of the data points closest to the index data point. In the following discussion, it will be assumed that the data cluster nucleus is first defined to be the index data point plus the one closest data point.

(4) Define a Nucleus Centroid

The centroid of the data cluster nucleus (i.e., of the index data point and the next closest data point) is then calculated in N-space. (If the data cluster nucleus includes additional data points as well, the centroid of all of the points in the data cluster nucleus would be determined.) This centroid, which will be referred to as the nucleus centroid, reflects the spatial center of the data cluster nucleus in N-space—in effect, the center in N-space of the "data cloud" consisting of the data cluster nucleus.

(5) Define a Candidate Data Point

Next a candidate data point is determined: the point outside of the data cluster nucleus which is closest to the index data point (i.e., the point closest to the index data point which is not a member of the data cluster nucleus). This data point is termed the "candidate" data point because it is a candidate for inclusion in the data cluster nucleus. The candidate data point can be located by looking at the list of data points closest to the index data point, and locating the closest data point which is not already a part of the data cluster nucleus.

(6) Expand the Data Cluster Nucleus to Include the Candidate Data Point

The candidate data point is then tested to see whether it too should be included in the data cluster nucleus (i.e., whether the data cluster nucleus should be expanded to include the candidate data point). If the distance in N-space between the nucleus centroid and the candidate data point falls within some predetermined distance, the data cluster nucleus can be expanded to include the candidate data point. If the data cluster nucleus is expanded in this manner, the process can return to step (4) above to calculate the new nucleus centroid of the expanded data cluster nucleus. A preferred method of determining whether the candidate data point is appropriate for inclusion in the data cluster nucleus is as follows.

First, an axis is defined in N-space between the nucleus centroid and the candidate data point. The data points in the data cluster nucleus are then "projected onto" this axis: the location of each data point on this axis is determined as if the data point was translated onto the axis along a line extending perpendicularly from the axis. The determinations of these projected locations is greatly simplified by the use of the Gram-Schmidt orthogonalization method, which is well known in the field of computational/analytical geometry.

The resulting axis extends between the nucleus centroid and the candidate data point, with the (projected) data points of the data cluster nucleus distributed along the axis. The location of the candidate data point along the axis relative to the data points of the data cluster can then be converted into a z score, in effect converting the spatial distance of the candidate data point from the centroid into a statistical distance. If the z score (statistical distance) of the candidate data point fits within some predetermined confidence level—for example, if its z-score is less than 1.96 (meaning that the candidate data point is within the distribution exhibited by 95% of the data points in the data cluster nucleus)—it can be regarded as acceptable for inclusion in the data cluster nucleus. The data cluster nucleus can then be redefined to include the candidate data point, and the process can step back to resume with step (4) above (i.e., a new nucleus centroid can be defined and a next candidate data point can be tested for inclusion in the new data cluster nucleus). Thus, note that the data cluster nucleus is iteratively expanded to include candidate data points that fit, with some predetermined degree of confidence, into the presumably normal distribution of data points about the nucleus centroid.

Otherwise, if the candidate data point does not fit within the predetermined confidence level—for example, if it has a z score greater than 1.96—it can be regarded as inappropriate for inclusion in the data cluster nucleus. In this case, it can be presumed that the data cluster nucleus has been expanded to include all appropriate data points, and the process of iteratively expanding the data cluster nucleus can cease. The resulting data cluster nucleus is presumed to be a completed data cluster.

It should be understood that confidence levels other than 95% (z=1.96) can be used, such as 90% (z=1.645), 98% (z=2.326), or 99% (z=2.576). Additionally, inclusion tests other than z-scores can be used; for example, an alternative inclusion test might simply expand the radius of the data cluster nucleus in stepwise fashion by some predetermined increment, and cease expansion once an increment is found to have no data points therein.

(7) Define Subsequent Data Point Cluster(s)

Once a data cluster has been identified, its data points can be removed from the data set, thereby leaving only (a) any other data clusters and (b) any spurious data points, data points not fitting within any clusters, and other "outliers." A subsequent data cluster can then be defined by returning to step (2) above, i.e., by locating the new index point amongst the remaining data points, defining a data cluster nucleus, and iteratively expanding it. The process can be ceased once a certain number of data clusters has been identified, once the identified clusters begin to include less than some threshold number of data points, or once some other stopping condition is met.

It should be understood that preferred versions of the invention have been discussed above in order to illustrate possible features and uses of the invention. Apart from organizing the different features of the foregoing versions in varying ways, other modifications are also considered to be within the scope of the invention. For example, as discussed above, the various steps of the cluster identification method might be modified in various ways: different definitions for the index data point might be used, different numbers of data points might initially be used to define the data cluster nucleus, the nucleus centroid calculations might be weighted in some respect, etc.

As noted above, the invention is believed to be particularly useful in the clustering/grouping of brain action potentials so that the resulting identified clusters can assist in the placement of electrodes for Deep Brain Stimulation (DBS), man-machine interfaces and neurally-driven prostheses, and similar applications. The clustering methods can also or alkternatively in these applications themselves, rather than just assisting in their installation; for example, the methods can be utilized in the control of man-machine interfaces, by identifying the states associated with particular (desired or actual) actions for some external device(s).

It is also notable that the cluster identification method of the invention can be used on types of data other than brain action potentials to yield useful information. Following is a review of other potential applications of the cluster identification method. As with the analysis of action potentials, a key advantage of the use of the foregoing cluster analysis method in the following exemplary applications is that the cluster analysis method is unsupervised, i.e., it does not require some preliminary estimate of the number of clusters present.

EXAMPLE 1

Gene Array and Proteomics Interpretations

Current gene and proteomic arrays are capable of simultaneously and rapidly analyzing thousands of genes or proteins. However, it is often difficult to correlate gene or protein expression to certain traits or conditions. For example, one may want to know what genes are expressed with a certain cancer. One could do a pair-wise comparison between genes, comparing their expression in subjects with and without cancer, but this would result in an astronomical number of possible comparisons (and the possibility of a fluke correlation would be very high). Further, it may not be any one gene but some combination of genes that predict a specific cancer. One way of using the cluster identification method to address this problem is to represent each subject as a data point, with each gene being a dimension in N-space, and each gene/dimension being assigned some value of expression. The cluster identification method can then identify any cluster(s) which identify a unique combination of genes that identifies the subject with cancer and separates them for those subjects who do not, then the cluster analysis will be able to find that combination of genes: if there is only one cluster (combining both subjects with and without cancer), there is no gene or combination separating the subjects, whereas two clusters which are (at least largely) distinguished by the presence of cancer should indicate that some combination of genes is related to the cancer. One could then start eliminating genes (dimensions) until the removal of a gene causes the independent clusters to collapse. Those genes (dimensions) whose removal does not alter the presence of the clusters are not relevant to the cancer expression. If more than two clusters are present, this may indicate that there are multiple combinations or causes of the cancer.

EXAMPLE 2

Search Engines

If one views a web page (or other collection of data) as a data point, and the terms therein being dimensions, search engine databases could periodically have some or all terms clustered so that if a user enters two or more terms to be searched, the cluster(s) containing these terms can be located, and the web pages (or other items) present within these cluster(s) can be given a higher priority/ranking in the listing of search results. (In particular, the web pages closest to the nucleus centroids of these clusters can be given a higher priority.) There are a number of ways the keywords can be used as a measure in a dimension. The presence of the keyword could be given a value of "1" while the absence of the keyword is given a "0." Alternatively, the measure could be given more resolving power by giving a more continuous value, such as the proportion of times a keyword is used versus other keywords.

The invention is not intended to be limited to the preferred versions described above, but rather is intended to be limited only by the claims set out below. Thus, the invention encompasses all different versions that fall literally or equivalently within the scope of these claims.

What is claimed is:

1. A method of identifying regions within the brain, the method comprising the steps of:
   a. providing a collection of N-dimensional data points, each data point being representative of a location in the brain and containing N>1 different types of data therefrom;
   b. sampling N different types of data from a location in the brain, thereby defining a sampled N-dimensional data point;
   c. automatically defining within a processor M discrete data point clusters (M>1) from the collected data points and from the sampled data point, wherein:
      i. each data point cluster contains data points which are proximate in N-dimensional space, and
      ii. the M data point clusters correspond to M discrete regions within the grey matter of the brain,
      and further wherein the M discrete data point clusters are defined by the following steps:
      (1) within a data set defined by the collected data points and the sampled data point, identifying the data point which has the greatest proportion of closely proximate data points in N-space, thereby identifying an index data point;
      (2) defining a data cluster nucleus which contains the index data point and closely proximate data points;
      (3) defining in N-space the centroid of the data points of the data cluster nucleus, thereby defining a nucleus centroid; and
      (4) expanding the data cluster nucleus to include data points which are outside of, but closely proximate in N-space to, the data cluster nucleus, wherein the expanded data cluster nucleus defines one of the M data point clusters;
   d. removing from the data set the data points corresponding to the defined data point cluster;
   e. defining a subsequent data point cluster by use of the foregoing step c.; and
   f. indicating whether the sampled data point is within a particular data point cluster, and therefore within a particular one of the M regions of the brain.

2. The method of claim 1 wherein N>4.

3. The method of claim 1 wherein M is neither:
   a. predefined within the processor, nor
   b. entered by a user.

4. The method of claim 1 wherein the N different types of data sampled from a location in the brain are sampled by a probe, the probe including two or more electrodes thereon, the electrodes being capable of capturing separate data points.

5. The method of claim 1 wherein the data sampled at the different locations of the brain is electrical signal data.

6. The method of claim 5 wherein the sampled electrical signal data includes at least two of:
   a. spike time;
   b. time between spikes;
   c. spike frequency;
   d. spike amplitude;
   e. slope of spike rise; and
   f. slope of spike fall.

7. A method of identifying regions within the brain, the method comprising the steps of:
   a. providing a collection of N-dimensional data points, each data point being representative of a location in the brain and containing N>1 different types of data therefrom;
   b. sampling N different types of data from a location in the brain, thereby defining a sampled N-dimensional data point;
   c. automatically defining within a processor M discrete data point clusters (M>1) from the collected data points and from the sampled data point, wherein:
      I. each data point cluster contains data points which are proximate in N-dimensional space, and
      II. the M data point clusters correspond to M discrete regions within the grey matter of the brain,
      and further wherein the M discrete data point clusters are defined by the following steps:
      i. within a data set defined by the collected data points and the sampled data point, identifying the data point which has the greatest proportion of closely proximate data points in N-space, thereby identifying an index data point;
      ii. defining a data cluster nucleus which contains the index data point and closely proximate data points;
      iii. defining in N-space the centroid of the data points of the data cluster nucleus, thereby defining a nucleus centroid; and
      iv. expanding the data cluster nucleus to include data points which are outside of, but closely proximate in N-space to, the data cluster nucleus, wherein the step of expanding the data cluster nucleus includes:
         (1) identifying the data point in the data set which is:
            (a) closest in N-space to the data cluster nucleus, but
            (b) outside of the data cluster nucleus,
            thereby defining a candidate data point;
         (2) if the distance in N-space between the nucleus centroid and the candidate data point falls within a predetermined distance:
            (a) expanding the data cluster nucleus to include the candidate data point, and
            (b) returning to the foregoing step iii. to redefine the nucleus centroid,
         wherein the expanded data cluster nucleus defines one of the M data point clusters; and
   d. indicating whether the sampled data point is within a particular data point cluster, and therefore within a particular one of the M regions of the brain.

8. The method of claim 7 wherein N>4.

9. The method of claim 7 wherein M is neither:
   a. predefined within the processor, nor
   b. entered by a user.

10. The method of claim 7 wherein the N different types of data sampled from a location in the brain are sampled by a probe, the probe including two or more electrodes thereon, the electrodes being capable of capturing separate data points.

11. The method of claim 7 wherein the data sampled at the different locations of the brain is electrical signal data.

12. The method of claim 11 wherein the sampled electrical signal data includes at least two of:
   a. spike time;
   b. time between spikes;

c. spike frequency;
d. spike amplitude;
e. slope of spike rise; and
f. slope of spike fall.

13. A method of identifying regions within the grey matter of the brain, the method comprising the steps of:
  a. sampling data at different locations within the grey matter, wherein N different types of data are sampled at each location (N>1), thereby generating a data set containing N-dimensional data points sampled at the locations;
  b. resolving within a processor M data point clusters (M>1) from the data points, wherein each data point cluster includes data points which are proximate in N-dimensional space, and wherein the step of resolving M data point clusters includes:
    (1) identifying within the data set the data point which has the greatest proportion of closely proximate data points in N-space, thereby identifying an index data point;
    (2) defining a data cluster nucleus which contains the index data point and closely proximate data points;
    (3) defining in N-space the centroid of the data points of the data cluster nucleus, thereby defining a nucleus centroid; and
    (4) expanding the data cluster nucleus to include data points which are outside of, but closely proximate in N-space to, the data cluster nucleus, wherein the step of expanding the data cluster nucleus includes:
      (a) identifying the data point in the data set which is:
        i. closest in N-space to the data cluster nucleus, but
        ii. outside of the data cluster nucleus,
        thereby defining a candidate data point;
      (b) if the distance in N-space between the nucleus centroid and the candidate data point falls within a predetermined distance:
        i. expanding the data cluster nucleus to include the candidate data point, and
        ii. returning to the foregoing step (3) to redefine the nucleus centroid,
      wherein the expanded data cluster nucleus defines one of the M data point clusters;
  c. defining M regions of the brain, each region including the locations corresponding to the data points of the data cluster.

14. The method of claim 13 wherein N>4.

15. The method of claim 13 wherein M is unknown to the processor prior to the step of resolving the M data point clusters.

16. The method of claim 13 wherein the M data point clusters resolved from the data points have boundaries which:
  a. are defined by their outermost data points in N-dimensional space; and
  b. do not overlap.

17. The method of claim 13 wherein the data sampled at the different locations of the brain is electrical signal data.

18. The method of claim 17 wherein the sampled electrical signal data includes at least two of:
  a. spike time;
  b. time between spikes;
  c. spike frequency;
  d. spike amplitude;
  e. slope of spike rise; and
  f. slope of spike fall.

19. A method of identifying regions within the grey matter of the brain, the method comprising the steps of:
  a. sampling data at different locations within the grey matter, wherein N different types of data are sampled at each location (N>1), thereby generating a data set containing N-dimensional data points sampled at the locations;
  b. defining within a processor a data point cluster from the data points, wherein the data point cluster includes data points which are proximate in N-dimensional space, the step of defining the data point cluster including:
    (1) identifying within the data set the data point which has the greatest proportion of closely proximate data points in N-space, thereby identifying an index data point;
    (2) defining a data cluster nucleus which contains the index data point and closely proximate data points;
    (3) defining in N-space the centroid of the data points of the data cluster nucleus, thereby defining a nucleus centroid; and
    (4) expanding the data cluster nucleus to include data points which are outside of, but closely proximate in N-space to, the data cluster nucleus, wherein the expanded data cluster nucleus defines one of the M data point clusters,
  c. removing from the data set the data points corresponding to the defined data point cluster; and
  d. defining a subsequent data point cluster by use of the foregoing step b.,
  each data point cluster defining a region of the brain, with each region including the locations corresponding to the data points of the data cluster.

20. The method of claim 19 wherein N>4.

21. The method of claim 19 wherein M is unknown to the processor prior to the step of resolving the M data point clusters.

22. The method of claim 19 wherein the M data point clusters defined from the data points have boundaries which:
  a. are defined by their outermost data points in N-dimensional space; and
  b. do not overlap.

23. The method of claim 19 wherein the data sampled at the different locations of the brain is electrical signal data.

24. The method of claim 23 wherein the sampled electrical signal data includes at least two of:
  a. spike time;
  b. time between spikes;
  c. spike frequency;
  d. spike amplitude;
  e. slope of spike rise; and
  f. slope of spike fall.

25. A device for identifying regions within the grey matter of the brain, the device comprising:
  A. a probe insertable within a brain, the probe having an electrode thereon which captures data points from the brain, each data point having N dimensions (N>1);
  B. a processor in communication with the electrode, wherein the processor:
    I. receives the measured N-dimensional data points, and
    II. resolves M data point clusters (M>1) from the data points, each data cluster including data points which are proximate in N-dimensional space,
    thereby identifying M regions of the brain, each region corresponding to one of the data clusters,
  wherein the processor is configured to determine the M data point clusters by use of the following steps:
    a. within a data set defined by the data points, identifying the data point which has the greatest proportion of closely proximate data points in N-space, thereby identifying an index data point;
    b. defining a data cluster nucleus which contains the index data point and closely proximate data points;

c. defining in N-space the centroid of the data points of the data cluster nucleus, thereby defining a nucleus centroid; and
d. expanding the data cluster nucleus to include data points which are outside of, but closely proximate in N-space to, the data cluster nucleus, by:
 (1) identifying the data point in the data set which is:
  (a) closest in N-space to the data cluster nucleus, but
  (b) outside of the data cluster nucleus, thereby defining a candidate data point;
 (2) if the distance in N-space between the nucleus centroid and the candidate data point falls within a predetermined distance:
  (a) expanding the data cluster nucleus to include the candidate data point, and
  (b) returning to the foregoing step c. to redefine the nucleus centroid,
 wherein the expanded data cluster nucleus defines one of the M data point clusters.

26. The device of claim 25 wherein N>4.
27. The device of claim 25 wherein M is neither:
a. predefined within the processor, nor
b. entered by a user.

* * * * *